(12) United States Patent
Cave et al.

(10) Patent No.: US 9,307,572 B2
(45) Date of Patent: *Apr. 5, 2016

(54) METHOD AND APPARATUS FOR SIMULTANEOUSLY RECEIVING ON TWO CARRIERS AND PERFORMING DISCONTINUOUS TRANSMISSION AND RECEPTION IN DUAL CELL HIGH SPEED DOWNLINK PACKET ACCESS

(71) Applicant: InterDigital Patent Holdings, Inc., Wilmington, DE (US)

(72) Inventors: Christopher R. Cave, Dollard-des-Ormeaux (CA); Benoit Pelletier, Roxboro (CA); Diana Pani, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,673

(22) Filed: Nov. 26, 2014

(65) Prior Publication Data

US 2015/0117378 A1 Apr. 30, 2015

Related U.S. Application Data

(63) Continuation of application No. 12/429,797, filed on Apr. 24, 2009, now Pat. No. 8,929,301.

(60) Provisional application No. 61/047,878, filed on Apr. 25, 2008, provisional application No. 61/085,051, filed on Jul. 31, 2008, provisional application No. 61/113,149, filed on Nov. 10, 2008.

(51) Int. Cl.
*H04W 76/04* (2009.01)
*H04W 52/02* (2009.01)
*H04L 1/18* (2006.01)

(52) U.S. Cl.
CPC .......... *H04W 76/048* (2013.01); *H04L 1/1835* (2013.01); *H04W 52/0216* (2013.01); *H04L 1/1812* (2013.01)

(58) Field of Classification Search
None
See application file for complete search history.

(56) References Cited

U.S. PATENT DOCUMENTS 8,098,635 B2   1/2012   Montojo et al.
8,711,785 B2   4/2014   Gholmieh et al.
(Continued)

FOREIGN PATENT DOCUMENTS

JP   2009508372 A   2/2009
JP   2011517895 A   6/2011
(Continued)

OTHER PUBLICATIONS

Ericcson et al., "Introduction of Dual-Cell HSDPA Operation on Adjacent Carriers", 3GPP TSG-RAN WG1 Meeting #54bis, R1-084031, (Prague, Czech Republic, Sep. 29-Oct. 3, 2008).

(Continued)

*Primary Examiner* — Kodzovi Acolatse
(74) *Attorney, Agent, or Firm* — Condo Roccia Koptiw LLP

(57) ABSTRACT

A method and an apparatus for simultaneously receiving on two carriers and performing discontinuous transmission (DTX) and discontinuous reception (DRX) in dual cell high speed downlink packet access (DC-HSDPA) are disclosed. A wireless transmit/receive unit (WTRU) receives a message for activating DRX for at least one of an anchor carrier and a supplementary carrier and applies the same DRX pattern to the anchor carrier and the supplementary carrier upon reception of the message. The message may be received via a high speed shared control channel (HS-SCCH) order. The WTRU may activate or de-activate the supplementary carrier based on the physical layer signal. Upon activation of the supplementary carrier, the WTRU may apply the same DRX pattern on both the anchor carrier and the supplementary carrier. The WTRU may flush a hybrid automatic repeat request (HARQ) buffer associated with the supplementary carrier upon de-activation of the supplementary carrier.

18 Claims, 9 Drawing Sheets

(56) References Cited

U.S. PATENT DOCUMENTS

| | | | |
|---|---|---|---|
| 2007/0133479 A1* | 6/2007 | Montojo et al. | 370/335 |
| 2009/0086657 A1 | 4/2009 | Alpert et al. | |
| 2009/0257387 A1* | 10/2009 | Gholmieh et al. | 370/329 |
| 2009/0296643 A1 | 12/2009 | Cave et al. | |
| 2011/0128925 A1* | 6/2011 | Lindoff et al. | 370/329 |

FOREIGN PATENT DOCUMENTS

| | | |
|---|---|---|
| JP | 5291186 B2 | 9/2013 |
| WO | WO2007/025138 | 3/2007 |

OTHER PUBLICATIONS

Ericsson et al., "Introduction of Dual-Cell HSDPA Operation on Adjacent Carriers", 3GPP TSG-RAN WG1 Meeting #53bis, R1-082702, (Warsaw, Poland, Jun. 30-Jul. 4, 2008).

Ericsson, "Considerations on Dual-Cell HSDPA Operation," 3GPP TSG RAN WG1 Meeting #52bis, R1-081545 (Mar. 31-Apr. 4, 2008).

Ericsson, "Initial Multi-Carrier HSPA performance evaluation," 3GPP TSG RAN WG1 Meeting #52bis, R1-081546 (Mar. 31-Apr. 4, 2008).

Huawei, "Discussion on CPC feature for DC-HSDPA," 3GPP TSG-RAN WG1 #54, R1-083074 (Aug. 18-22, 2008).

Huawei, "Introduction of Dual-Cell HSDPA Operation on Adjacent Carriers", 3GPP TSG-RAN WG1Meeting #54bis, R1-084690, (Prague, Czech Republic, Sep. 29-Oct. 3, 2008).

Huawei, "Dual Cell HSDPA Operation Consideration," 3GPP TSG-RAN WG2 #61bis, R2-081899 (Mar. 31-Apr. 4, 2008).

Nokia et al., "Considerations on the dual cell HSDPA operation," 3GPP TSG-RAN WG1 Meeting #52bis, R1-081434 (Mar. 31-Apr. 4, 2008).

Qualcomm Europe et al., "Feasibility Study on Dual-Cell HSDPA Operation", 3GPP TSG RAN #39 Meeting, RP-080148, (Puerto Vallarta, Mexico, Mar. 4-7, 2008).

Qualcomm Europe, "DC-HSDPA and CPC," 3GPP TSG-RAN WG1 #53bis, R1-082294 (Jun. 30-Jul. 4, 2008).

Qualcomm Europe, "Dual Carrier operation for CELL_DCH," 3GPP TSG-RAN WG1 #52bis, R1-081438 (Mar. 31 -Apr. 4, 2008).

Samsung, "Considerations on dual-cell HSDPA operation," 3GPP TSG RAN WG1 Meeting #52bis, R1-081241 (Mar. 31-Apr. 4, 2008).

Third Generation Partnership Project, "Technical Specification Group Radio Access Network; Physical Layer Procedures (FDD) (Release 8)", 3GPP TS 25.214 V8.1.0 (Mar. 2008).

Third Generation Partnership Project, "Technical Specification Group Radio Access Network; High Speed Downlink Packet Access (HSDPA); Overall Description; Stage 2 (Release 8)", 3GPP TS 25.308 V8.3.0 (Sep. 2008).

Third Generation Partnership Project, "Technical Specification Group Radio Access Network; Radio Resource Control (RRC); Protocol Specification; (Release 8)", 3GPP TS 25.331 V8.1.0 (Dec. 2007).

Third Generation Partnership Project, "Technical Specification Group Radio Access Network; Radio Resource Control (RRC); Protocol Specification; (Release 8)", 3GPP TS 25.331 V8.5.0 (Dec. 2008).

Third Generation Partnership Project, "Technical Specification Group Radio Access Network; Multiplexing and channel coding (FDD) (Release 1999)," 3GPP TS 25.212 V3.11.0 (Sep. 2002).

Third Generation Partnership Project, "Technical Specification Group Radio Access Network; Multiplexing and channel coding (FDD) (Release 4)," 3GPP TS 25.212 V4.6.0 (Sep. 2002).

Third Generation Partnership Project, "Technical Specification Group Radio Access Network; Multiplexing and channel coding (FDD) (Release 5)," 3GPP TS 25.212 V5.10.0 (Jun. 2005).

Third Generation Partnership Project, "Technical Specification Group Radio Access Network; Multiplexing and channel coding (FDD) (Release 6)," 3GPP TS 25.212 V6.10.0 (Dec. 2006).

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.11.0 (Jun. 2005).

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).

Third Generation Partnership Project, "Technical Specification Group Radio Access Network; High Speed Downlink Packet Access (HSDPA); Overall description; Stage 2 (Release 6)," 3GPP TS 25.308 V6.4.0 (Mar. 2007).

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.18.0 (Dec. 2007).

Third Generation Partnership Project, "Technical Specification Group Radio Access Network; Radio Resource Control (RRC); Protocol Specification (Release 5)," 3GPP TS 25.331 V5.21.0 (Dec. 2007).

Third Generation Partnership Project, "Technical Specification Group Radio Access Network; Radio Resource Control (RRC); Protocol Specification (Release 7)," 3GPP TS 25.331 V7.8.0 (Mar. 2008).

Third Generation Partnership Project, "Technical Specification Group Radio Access Network; Multiplexing and channel coding (FDD) (Release 8)," 3GPP TS 25.212 V8.10 (Mar. 2008).

Third Generation Partnership Project, "Technical Specification Group Radio Access Network; Radio Resource Control (RRC); Protocol Specification (Release 5)," 3GPP TS 25.331 V5.23.0 (Dec. 2008).

Third Generation Partnership Project, "Technical Specification Group Radio Access Network; Radio Resource Control (RRC); Protocol Specification (Release 6)," 3GPP TS 25.331 V6.21.0 (Mar. 2009).

Third Generation Partnership Project, "Technical Specification Group Radio Access Network; High Speed Downlink Packet Access (HSDPA); Overall description; Stage 2 (Release 7)," 3GPP TS 25.308 V7.6.0 (Mar. 2008).

Third Generation Partnership Project, "Technical Specification Group Radio Access Network; Radio Resource Control (RRC); Protocol Specification (Release 6)," 3GPP TS 25.331 V6.16.0 (Dec. 2007).

Third Generation Partnership Project, "Technical Specification Group Radio Access Network; Physical layer procedures (FDD) (Release 7)," 3GPP TS 25.214 V7.8.0 (Mar. 2008).

Third Generation Partnership Project, "Technical Specification Group Radio Access Network; High Speed Downlink Packet Access (HSDPA); Overall description; Stage 2 (Release 8)," 3GPP TS 25.308 V8.1.0 (Mar. 2008).

Third Generation Partnership Project, "Technical Specification Group Radio Access Network; High Speed Downlink Packet Access (HSDPA); Overall description; Stage 2 (Release 7)," 3GPP TS 25.308 V7.9.0 (Dec. 2008).

Third Generation Partnership Project, "Technical Specification Group Radio Access Network; Multiplexing and channel coding (FDD) (Release 7)," 3GPP TS 25.212 V7.7.0 (Nov. 2007).

Third Generation Partnership Project, "Technical Specification Group Radio Access Network; High Speed Downlink Packet Access (HSDPA); Overall description; Stage 2 (Release 8)," 3GPP TS 25.308 V8.5.0 (Mar. 2009).

(56) References Cited

OTHER PUBLICATIONS

Third Generation Partnership Project, "Technical Specification Group Radio Access Network; Radio Resource Control (RRC); Protocol Specification (Release 4)," 3GPP TS 25.331 V4.20.0 (Dec. 2008).

Third Generation Partnership Project, "Technical Specification Group Radio Access Network; Physical layer procedures (FDD) (Release 7)," 3GPP TS 25.214 V7.11.0 (Mar. 2009).

Third Generation Partnership Project, "Technical Specification Group Radio Access Network; Physical layer procedures (FDD) (Release 8)," 3GPP TS 25.214 V8.5.0 (Mar. 2009).

Third Generation Partnership Project, "Technical Specification Group Radio Access Network; Multiplexing and channel coding (FDD) (Release 8)," GPP TS 25.212 V8.5.0 (Mar. 2009).

Third Generation Partnership Project, "Technical Specification Group Radio Access Network; Multiplexing and channel coding (FDD) (Release 7)," 3GPP TS 25.212 V7.10.0 (Mar. 2009).

Third Generation Partnership Project, "Technical Specification Group Radio Access Network; Radio Resource Control (RRC); Protocol Specification (Release 8)," 3GPP TS 25.331 V8.6.0 (Mar. 2009).

Third Generation Partnership Project, "Technical Specification Group Radio Access Network; Radio Resource Control (RRC); Protocol Specification (Release 7)," 3GPP TS 25.331 V7.11.0 (Dec. 2008).

3rd Generation Partnership Project (3GPP), R1-082824, "DC-HSDPA and CPC: Outstanding Issues", Qualcomm Europe, 3GPP TSG-RAN WG1 #54, Jeju Island, South Korea, Aug. 18-22, 2008, 3 pages.

* cited by examiner

METHOD AND APPARATUS FOR SIMULTANEOUSLY RECEIVING ON TWO CARRIERS AND PERFORMING DISCONTINUOUS TRANSMISSION AND RECEPTION IN DUAL CELL HIGH SPEED DOWNLINK PACKET ACCESS

CROSS REFERENCE TO RELATED APPLICATIONS

This application is a continuation of U.S. patent application Ser. No. 12/429,797 filed Apr. 24, 2009, which claims benefit of U.S. Provisional Patent Application Nos. 61/047,878 filed Apr. 25, 2008, 61/085,051 filed Jul. 31, 2008, and 61/113,149 filed Nov. 10, 2008 which are incorporated by reference as if fully set forth.

FIELD OF INVENTION

This application is related to wireless communications.

BACKGROUND

The third generation partnership project (3GPP) standards are continuously evolving. Early releases focused primarily on voice communications, while more recent releases have directed attention to data communication services such as high speed packet access (HSPA). The continued development of packet access services is driven by the desire of mobile users to be connected to Internet from anywhere at any time for leisure, business or other pursuits.

Continuous Packet Connectivity (CPC) was introduced in Release 7 to keep a device on the high speed channels, (i.e., in active state), as long as possible while no data transfer is ongoing by reducing the negative effects of remaining active during periods of low activity, (i.e., reducing power consumption and reducing the bandwidth requirements for radio layer signaling during that time). Among the features implemented along with CPC are discontinuous transmission (DTX) and discontinuous reception (DRX). DTX patterns and DRX patterns along with associated sets of rules allow a wireless transmit/receive unit (WTRU) to turn off its transmitter and receiver during periods of low activity to conserve power.

Uplink DTX is a mechanism that defines how the WTRU will discontinuously transmit the dedicated physical control channel (DPCCH). The uplink DTX is configured by a radio network controller (RNC). The uplink DPCCH burst pattern and the uplink DPCCH preamble and postamble together define the discontinuous uplink DPCCH operation. Uplink DTX is dependent on enhanced dedicated channel (E-DCH) and high speed dedicated physical control channel (HS-DPCCH) activity. Uplink DTX may be configured without configuring downlink DRX.

FIG. 1 shows a DPCCH burst pattern for the uplink. Two DTX patterns (UE_DTX_cycle_1 and UE_DTX_cycle_2) are defined for a WTRU for discontinuous uplink DPCCH operation. Either UE_DTX_cycle_1 or UE_DTX_cycle_2 is applied dependent on the duration of E-DCH inactivity. UE_DTX_cycle_2 is used when there is no E-DCH transmission for a predetermined number of subframes. Accordingly, the DPCCH transmission rate is autonomously adapted to data transmission activity. For example, during higher data transmission activity the uplink DPCCH may be configured to transmit more frequently, while during lower data transmission activity the DPCCH may be configured to transmit less often to produce a DTX gain. The DPCCH burst patterns for different WTRUs serviced by a Node B may be offset so that different WTRUs may have their DPCCH transmission phase in their respective DTX cycles at different times.

DPCCH is transmitted whenever E-DCH or HS-DPCCH is transmitted. When a WTRU is not transmitting data on an E-DCH or an HS-DPCCH, the WTRU does not transmit DPCCH except for a short burst of sub-frames once every UE_DTX_cycle_1 sub-frames, (subframes 107, 109, 111, . . . ). If the WTRU has not transmitted E-DCH during the last Inactivity_Threshold_for_UE_DTX_cycle_2 sub-frames, (last E-DCH frame 101), the WTRU does not transmit DPCCH except for a short burst of sub-frames once every UE_DTX_cycle_2 sub-frames, (subframes 113, . . . ).

A dual cell high speed downlink packet access (DC-HSDPA) mode has been introduced wherein two HSDPA carriers are used for downlink transmissions to increase the throughput per cell. In a DC-HSDPA mode, a cell is covered by up to two HSDPA carriers (possibly adjacent) in the same band. The frequency diversity between the carriers may provide a gain. DC-HSDPA provides both an increase in throughput and a reduction in latency. In poor radio conditions, where other techniques such as multiple-input multiple-out (MIMO) may not be practical, DC-HSDPA allows more UEs access to higher data rates. On the network side, DC-HSDPA allows efficient load balancing across carriers in addition to some capacity gain. A WTRU may be configured for DC-HSDPA operation in a CELL_DCH state.

While DTX and DRX operations are well defined for single carrier operations, there is currently no mechanism to handle DRX operations in a DC-HSDPA mode. In addition, in case that an HS-SCCH is transmitted only one of the carriers, there is currently no mechanism to indicate to the WTRU on which carrier the associated HS-PDSCH is transmitted on.

SUMMARY

A method and an apparatus for simultaneously receiving on two carriers and performing DTX and DRX in DC-HSDPA are disclosed. A WTRU receives a message for activating DRX for at least one of an anchor carrier and a supplementary carrier and applies the same DRX pattern to the anchor carrier and the supplementary carrier upon reception of the message. The message may be received via an HS-SCCH order. The WTRU may de-activate DRX on both the anchor carrier and the supplementary carrier if data is received via any one of the anchor carrier and the supplementary carrier. Alternatively, the WTRU may de-activate DRX on the supplementary carrier only if data is received via the supplementary carrier.

The WTRU may activate or de-activate the supplementary carrier based on the physical layer signal, such as HS-SCCH order. The WTRU may de-activate the supplementary carrier upon expiration of an inactivity timer for the supplementary carrier. The WTRU may apply the same DRX pattern to both an anchor carrier and the supplementary carrier upon activation of the supplementary carrier. The WTRU may flush a hybrid automatic repeat request (HARQ) buffer associated with the supplementary carrier upon de-activation of the supplementary carrier. Alternatively, the WTRU may process data received via the supplementary carrier as new data after re-activating the supplementary carrier.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

Hereinafter, the terminology "cell" and "carrier" are used interchangeably with respect to DC-HSDPA. When referred to hereafter, the terminology "anchor cell" refers to a downlink carrier associated with the uplink carrier assigned to a WTRU, and the terminology "supplementary cell" refers to a downlink carrier that is not the anchor carrier. Hereinafter, the terminologies "anchor cell" and "anchor carrier" are equivalent to "serving cell" and "serving carrier" or "primary cell" and "primary carrier", and the terminologies "supplementary cell" and "supplementary carrier" are equivalent to "secondary cell" and "secondary carrier."

Figure 1:
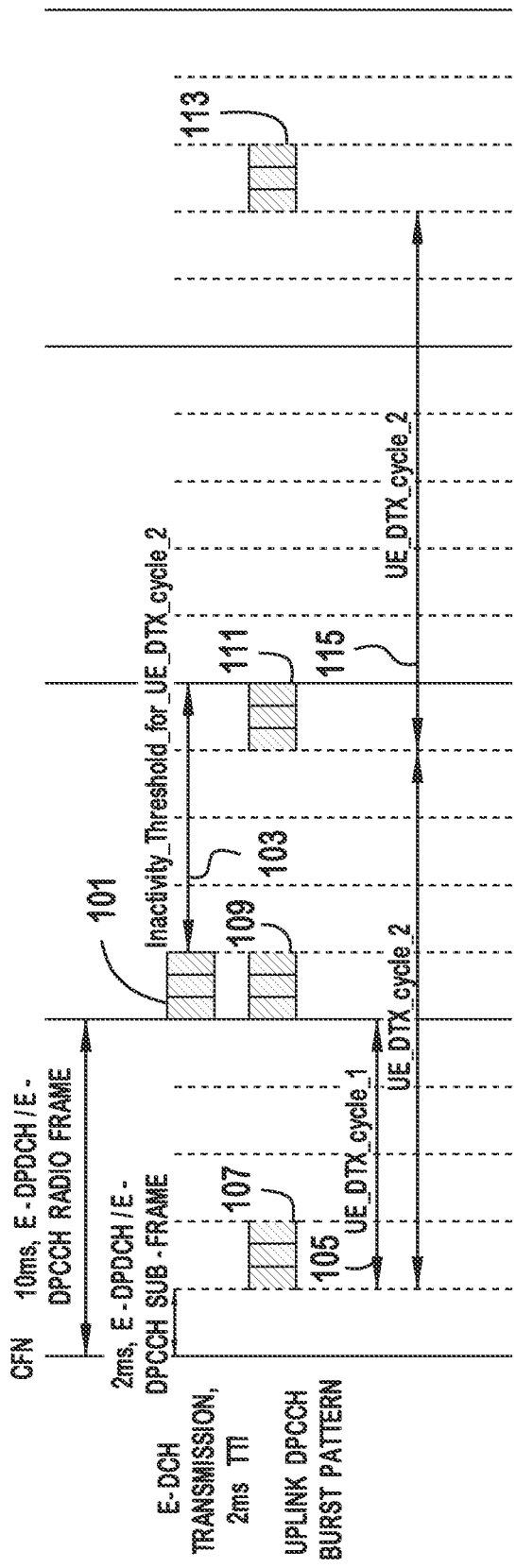
FIG. 1 shows a conventional DTX pattern.
Figure 2:
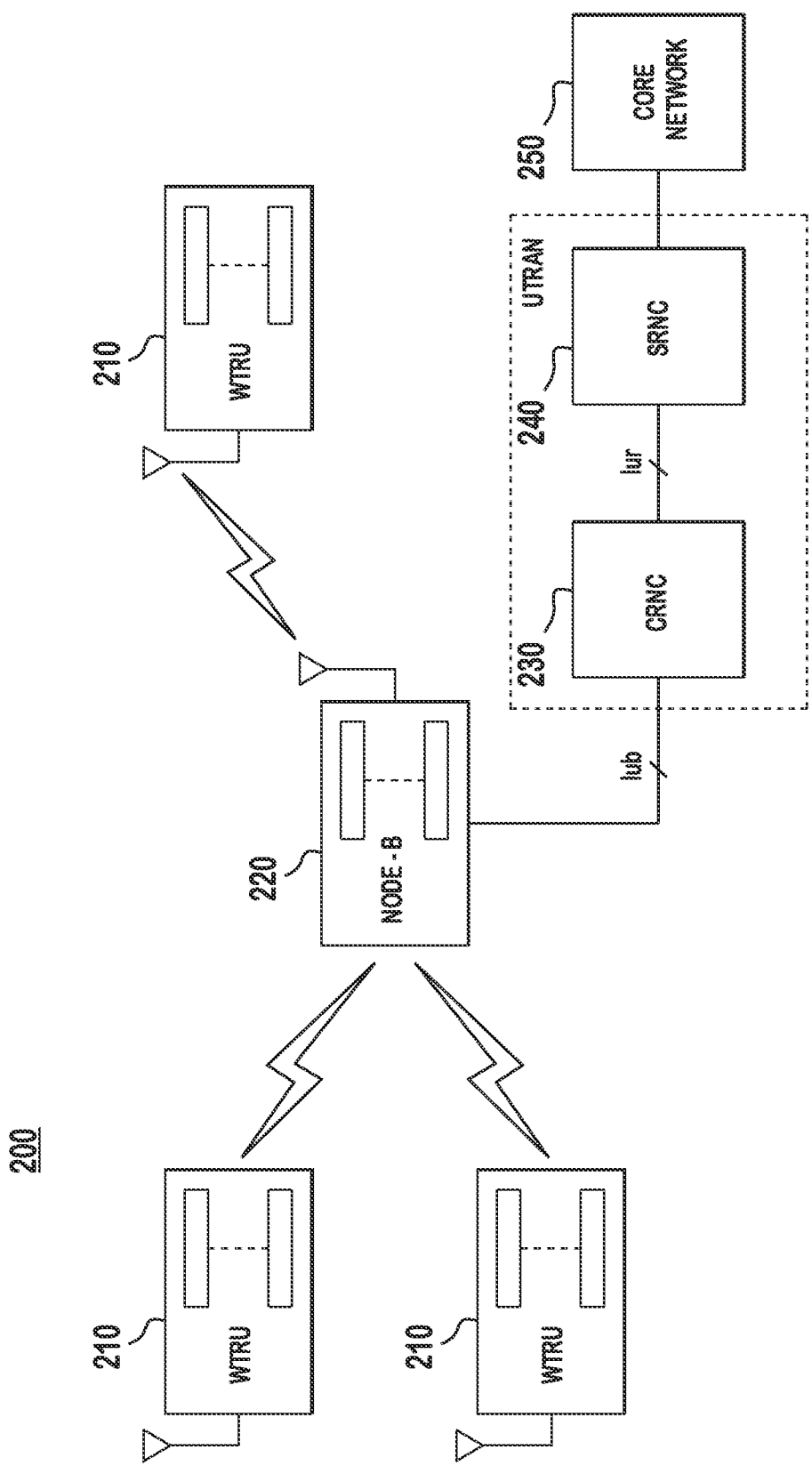
FIG. 2 shows an example wireless communication system.

FIG. 2 shows an example wireless communication system 200 including a plurality of WTRUs 210, a Node-B 220, a controlling radio network controller (CRNC) 230, a serving radio network controller (SRNC) 240, and a core network 250. The WTRUs 210 are in communication with the Node-B 220, which is in communication with the CRNC 230 and the SRNC 240. The CRNC 230 and the SRNC 240 may be the same entity. The Node B 220 and the WTRU 210 are DC-HSDPA-capable and may transmit and receive downlink data via two carriers.

Figure 3:
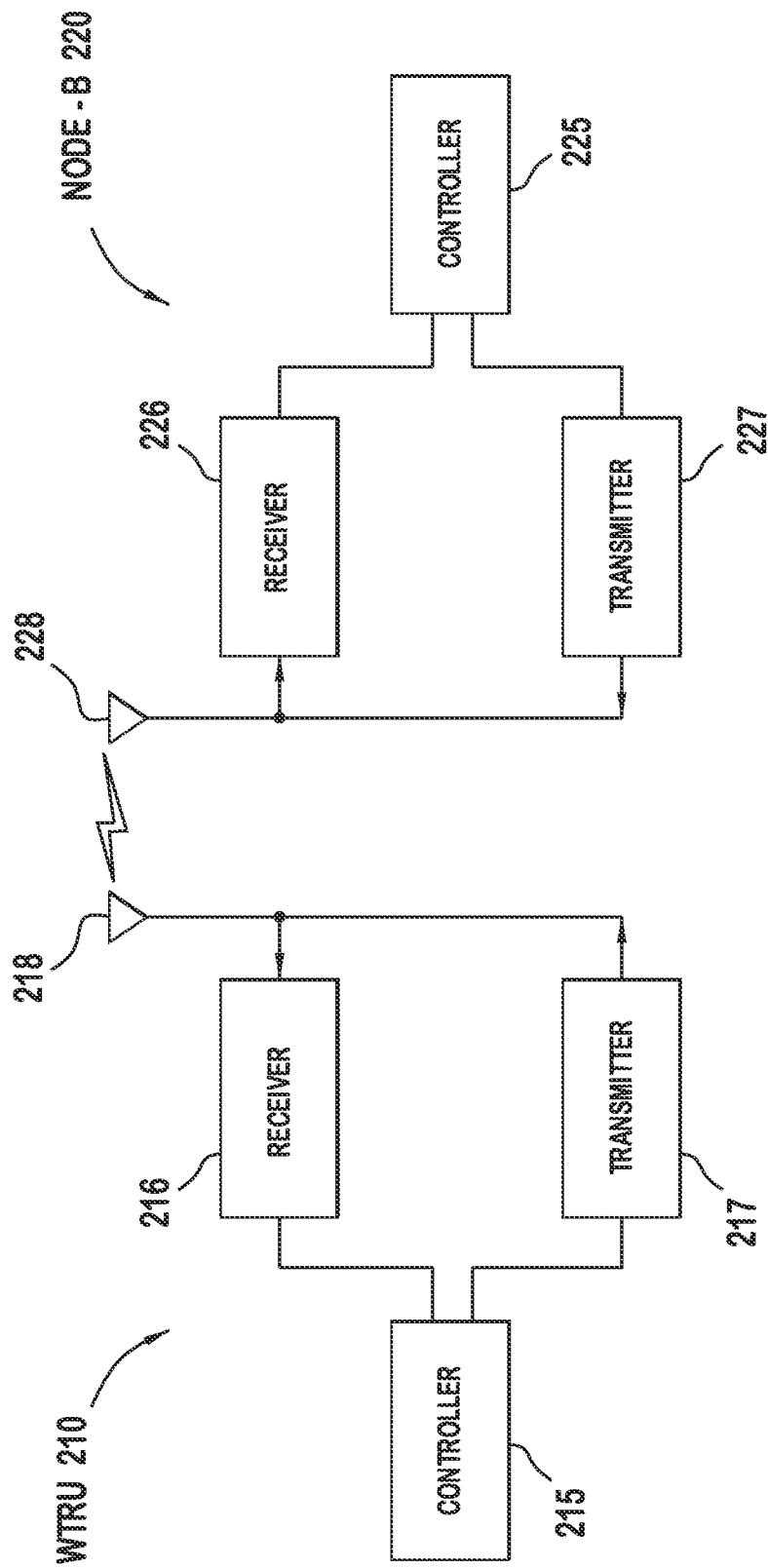
FIG. 3 is a block diagram of an example wireless transmit/receive unit (WTRU) and an example Node-B of the wireless communication system shown in FIG. 2.

FIG. 3 is a block diagram of an example WTRU 210 and an example Node-B 220. The WTRU 210 is in communication with the Node-B 220 and both are configured to perform DTX and DRX in a DC-HSDPA mode. The WTRU 210 includes a controller 215, a receiver 216, a transmitter 217, and an antenna 218. The controller 215 is configured to control the receiver 216 and the transmitter 217 for DRX and DTX operations in a DC-HSDPA mode in accordance with embodiments disclosed below. The Node-B 220 includes a controller 225, a receiver 226, a transmitter 227, and an antenna 228. The controller 225 is configured to control the receiver 226 and the transmitter 227 for DTX and DRX operations in a DC-HSDPA mode in accordance with embodiments disclosed below.

The Node-B 220 may transmit data to the WTRU 210 via an anchor carrier and a supplementary carrier simultaneously and the WTRU 210 may receive data on the anchor carrier and the supplementary carrier simultaneously. The anchor carrier and the supplementary carrier may operate in the same frequency band. The anchor carrier and the supplementary carrier may have the same time reference and their downlinks may be synchronized.

When DC-HSDPA operation is activated, a WTRU 210 may receive data from any one of the two downlink carriers. If the WTRU 210 is configured to monitor for the HS-SCCH on both carriers simultaneously, it would be advantageous to establish a new DRX pattern to take the supplementary carrier into consideration. The DRX pattern (or equivalently the HS-SCCH reception pattern) for the anchor carrier may follow the conventional pattern currently implemented. Embodiments for configuring the DRX pattern for the supplementary carrier are disclosed below.

In accordance with a first embodiment, the DRX patterns for the anchor cell and the supplementary cell are aligned. The WTRU HS-SCCH reception pattern for the supplementary carrier is exactly aligned to the HS-SCCH reception pattern of the anchor carrier. This allows the WTRU to monitor the HS-SCCH on both carriers at the same time, saving battery power depending on the WTRU hardware implementation and configuration. Additionally, this would allow the network to signal only one DRX pattern, which will be applied to both anchor cell and supplementary cell.

Optionally, if there is a supplementary uplink carrier, the DTX pattern of both anchor and supplementary uplink carriers may be aligned. The network signals only one DTX pattern which is applied to both uplink carriers.

The initiation (or activation and deactivation) of the DRX and/or DTX pattern may be signaled via an HS-SCCH order, (i.e., DRX activation/deactivation bit in an HS-SCCH order), from the anchor cell or the supplementary cell and implicitly applied to both cells. Alternatively, an HS-SCCH order may be transmitted via each cell to control DRX (and/or DTX) of each cell independently.

In accordance with the first embodiment, the HS-SCCH reception pattern for both carriers may be defined as a set of subframes whose HS-SCCH DRX radio frame number CFN_DRX and subframe number S_DRX satisfy the following equation:

$$((5 \times CFN\_DRX - UE\_DTX\_DRX\_\text{Offset} + S\_DRX) \text{ MOD } UE\_DRX \text{ cycle}) = 0; \quad \text{Equation (1)}$$

where UE_DTX_DRX_Offset is uplink DPCCH burst pattern and HS-SCCH reception pattern offset in subframes, and UE_DRX_cycle is HS-SCCH reception pattern length in subframes.

Figure 4:
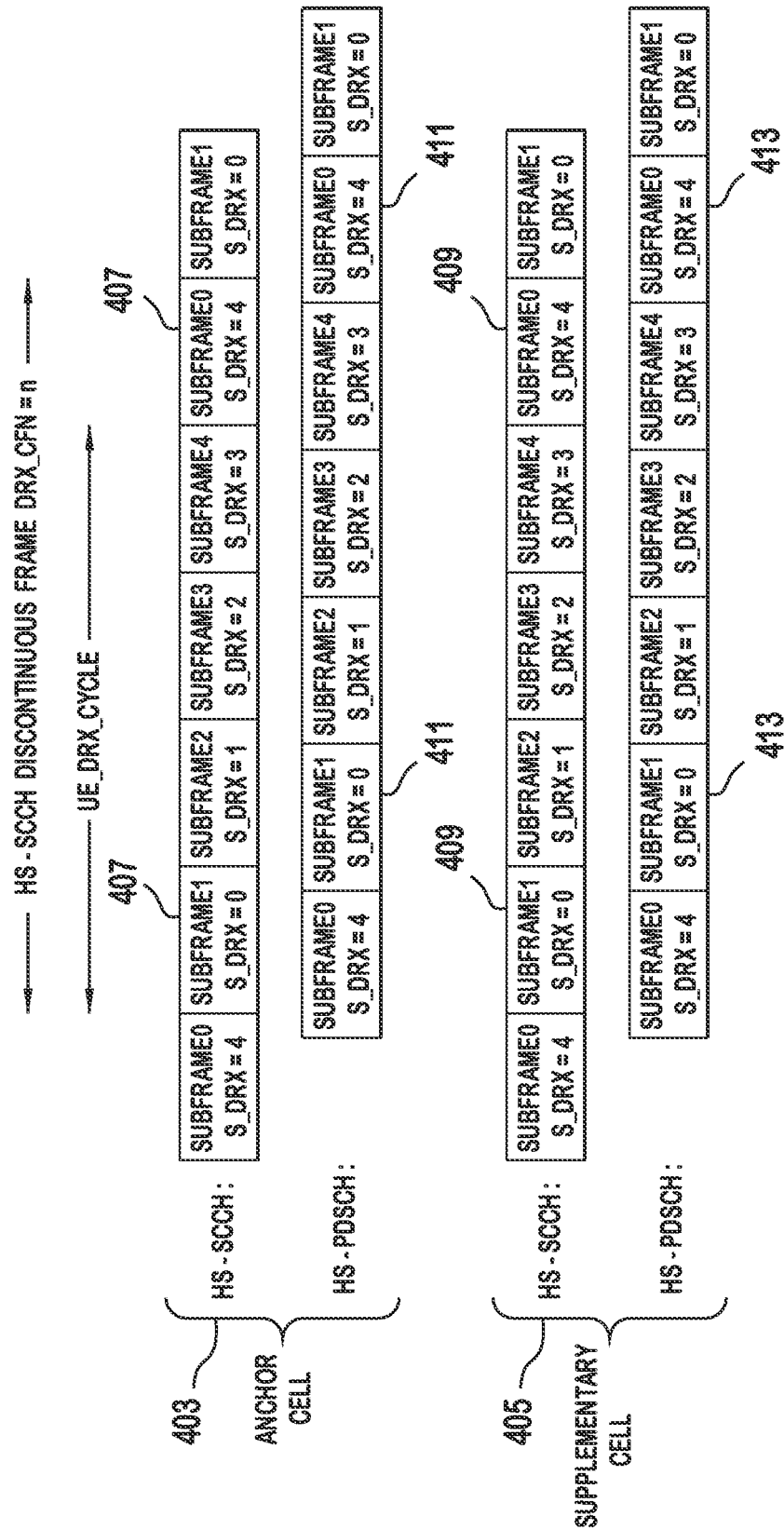
FIG. 4 shows aligned DRX patterns for DC-HSDPA.

FIG. 4 shows aligned DRX patterns for 2 ms transmission time interval (TTI) for UE_DRX_cycle=4. Top rows 403 show DRX pattern on the anchor cell and bottom rows 405 show DRX pattern on the supplementary cell. The DRX patterns for the anchor cell and the supplementary cell are aligned such that the WTRU monitors HS-SCCH on subframes 407 and 409 and may receive HS-PDSCH on subframes 411 and 413, simultaneously.

In addition, if the WTRU is not configured to monitor any HS-SCCH on the supplementary carrier, the WTRU may be allowed to not listen to the supplementary carrier, (i.e., constant DRX), except during TTIs where the WTRU expects an HS-PDSCH (as would be indicated by an HS-SCCH sent over the anchor carrier).

In accordance with a second embodiment, the WTRU DRX pattern for the supplementary carrier is offset to the DRX pattern of the anchor carrier. This offset is either pre-defined or configured by the network. In either cases, the HS-SCCH reception pattern for the anchor carrier may be defined as a set of subframes whose HS-SCCH DRX radio frame number CFN_DRX and subframe number S_DRX verify the following equation:

$$((5 \times CFN\_DRX - UE\_DTX\_DRX\_Offset + S\_DRX) \text{ MOD } UE\_DRX \text{ cycle}) = 0. \quad \text{Equation (2)}$$

The HS-SCCH reception pattern for the supplementary carrier may be defined as a set of subframes whose HS-SCCH discontinuous reception radio frame number CFN_DRX and subframe number S_DRX verify the following equation:

$$((5 \times CFN\_DRX - UE\_DTX\_DRX\_Offset + SUPP\text{-}C\_OFFSET + S\_DRX) \text{ MOD } UE\_DRX \text{ cycle}) = 0; \quad \text{Equation (3)}$$

where SUPPC_OFFSET is the offset of the HS-SCCH reception pattern for the supplementary carrier to the HS-SCCH reception pattern for the anchor carrier. SUPPC_OFFSET may be pre-defined or configured by the network. The SUPPC_OFFSET value may be one (1) in which case the DRX patterns for the anchor and supplementary carrier are staggered. Alternatively, SUPPC_OFFSET may be set to floor (UE_DRX cycle/2) in which case the DRX patterns for the anchor and supplementary carriers alternate.

Figure 5:
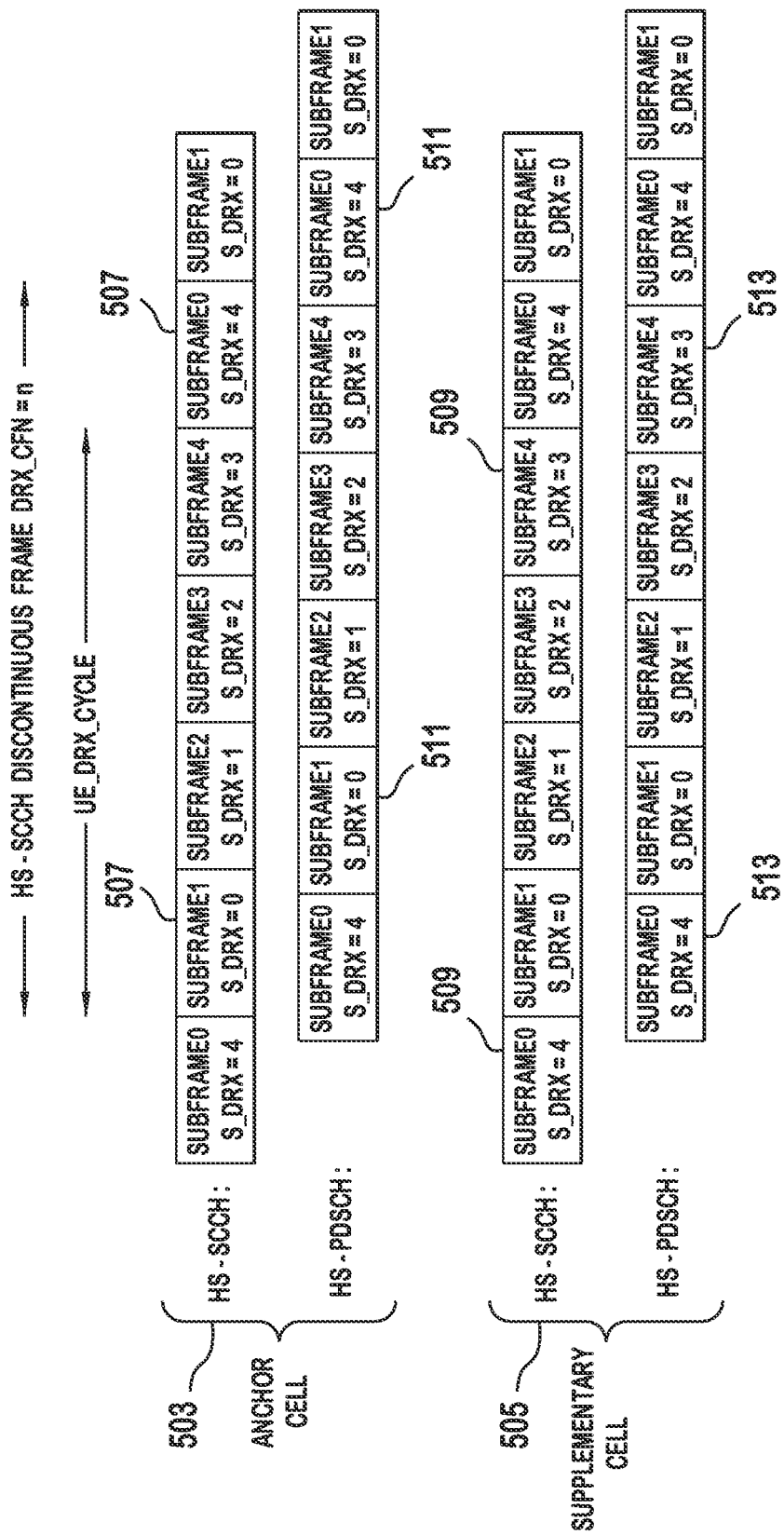
FIG. 5 shows offset DRX patterns for DC-HSDPA.

FIG. 5 shows offset DRX patterns for 2 ms TTI for UE_DRX_cycle=4 and SUPPC_OFFSET=1. Top rows 503 show DRX patterns on the anchor cell and bottom rows 505 show DRX pattern on the supplementary cell. The DRX patterns for the anchor cell and the supplementary cell are staggered such that the WTRU monitors HS-SCCH on subframes 507 and 509 and may receive HS-PDSCH on subframes 511 and 513.

The WTRU DTX cycle may be aligned to the DRX cycle of only the anchor carrier, or only the supplementary carrier. Alternatively, the WTRU DTX cycle may be aligned with the DRX cycle of both the anchor and the supplementary carriers. Alternatively, the WTRU may always be in continuous transmission (CTX) when in continuous reception (CRX) on one or both downlink carriers.

The initiation of the DRX and/or DTX mode may be signaled via an HS-SCCH order from the anchor cell or the supplementary cell and implicitly applied to both cells. Alternatively, the DRX and/or DTX may be activated for each cell independently, for example by using an HS-SCCH order originating from each cell.

The DRX patterns of the anchor carrier and the supplementary carrier may be configured independently, in which case different independent DRX cycles may be applied to different downlink carriers. In this case, the DRX may be activated and deactivated for each cell independently or jointly.

In addition, if the WTRU is not configured to monitor any HS-SCCH on the supplementary carrier, the WTRU may be allowed to not listen to the supplementary carrier (constant DRX), except during TTIs where the WTRU expects an HS-PDSCH (as would be indicated by an HS-SCCH sent over the anchor carrier).

In accordance with a third embodiment, a WTRU indicates to the network via higher layer signaling its reception pattern preference. Depending on the carrier spacing, different WTRU implementation may benefit from a different DRX pattern. For example, the WTRU may signal one of the following options via higher layer signaling:

(1) The WTRU prefers aligned DRX patterns across carriers;

(2) The WTRU prefers staggered DRX patterns across carriers; or (3) Any of other DRX pattern described throughout this disclosure.

The WTRU may also indicate its preferred SUPPC_OFFSET value to the network via RRC signaling. The network then configures the WTRU DRX pattern for the supplementary carrier accordingly. The network may not satisfy the WTRU request. Alternatively, the WTRU may assume that the network always uses the DRX pattern the WTRU requested.

In addition, if the WTRU is not configured to monitor any HS-SCCH on the supplementary carrier, the WTRU may be allowed to not listen to the supplementary carrier (constant DRX), except during TTIs where the WTRU expects an HS-PDSCH (as would be indicated by an HS-SCCH sent over the anchor carrier).

In accordance with a fourth embodiment, the WTRU DRX pattern for the supplementary carrier may have a different period than the DRX pattern of the anchor carrier. The DRX pattern of the supplementary carrier period may be an integer multiple of the anchor carrier DRX pattern period. The multiplicative factor may be pre-defined or signaled by the network.

If the multiplicative factor is M, the HS-SCCH reception pattern for the supplementary carrier may be defined as a set of subframes whose HS-SCCH DRX radio frame number CFN_DRX and subframe number S_DRX satisfy the following equation:

$$((5 \times CFN\_DRX - UE\_DTX\_DRX\_Offset + S\_DRX) \text{ MOD}(M \times UE\_DRX \text{ cycle})) = 0. \quad \text{Equation (4)}$$

For example, the multiplicative factor may be two (2). In this case, the HS-SCCH reception pattern for the supplementary carrier may be defined as a set of subframes whose HS-SCCH DRX radio frame number CFN_DRX and subframe number S_DRX verify the following equation:

$$((5 \times CFN\_DRX - UE\_DTX\_DRX\_Offset + S\_DRX) \text{ MOD}(2 \times UE\_DRX \text{ cycle})) = 0. \quad \text{Equation (5)}$$

Figure 6:
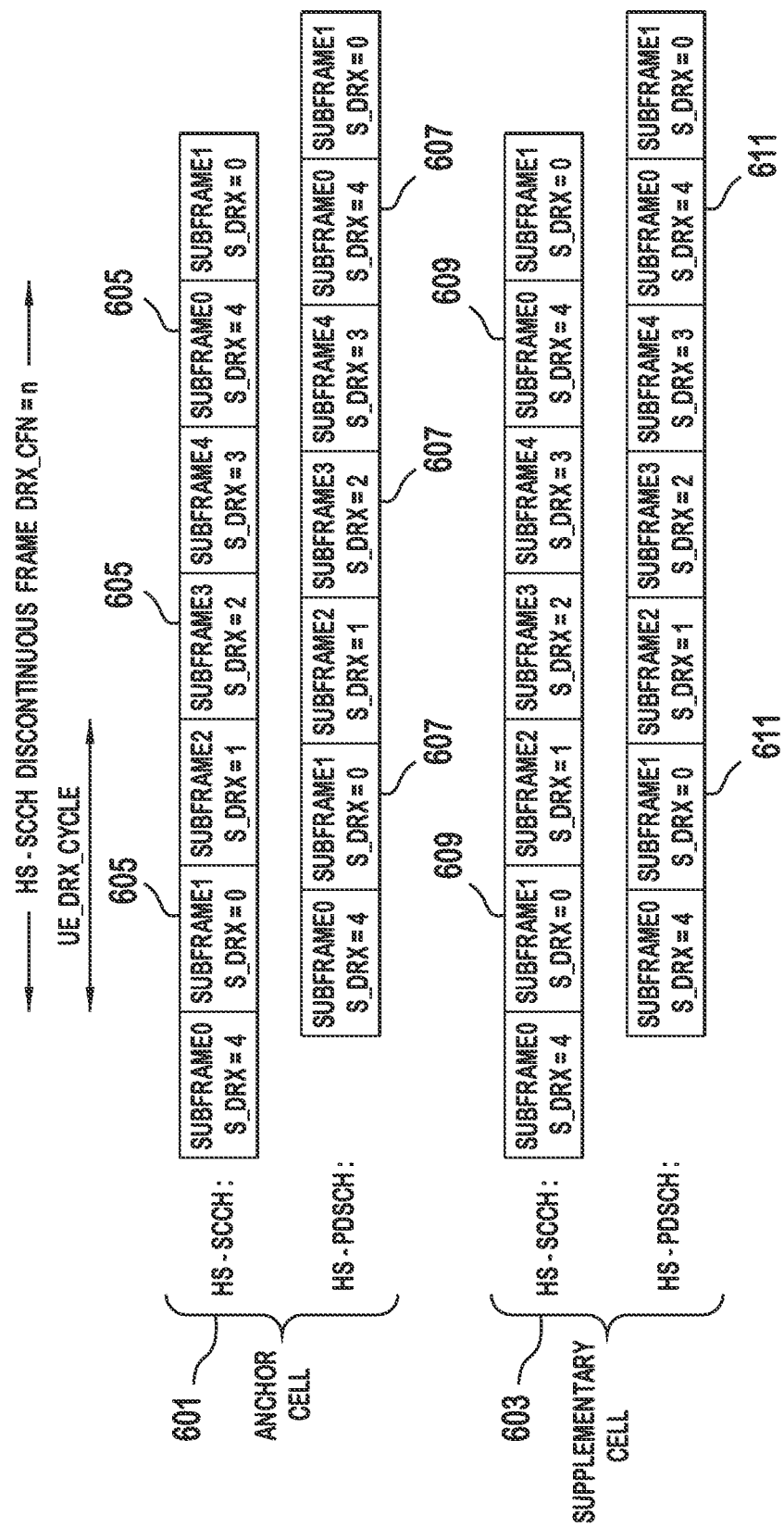
FIG. 6 shows dual cycle DRX patterns for DC-HSDPA.

FIG. 6 shows dual cycle DRX patterns for 2 ms TTI with UE_DRX_cycle=2 and M=2, where the DRX cycle of the supplementary cell is exactly twice as long as the DRX cycle for the anchor cell. Top rows 601 show DRX pattern on the anchor cell and bottom rows 603 show DRX pattern on the supplementary cell. The DRX cycle of the supplementary cell is twice longer than that of the anchor cell such that the WTRU monitors HS-SCCH on subframes 605 on the anchor cell and subframes 609 on the supplementary cell, and may receive HS-PDSCH on subframes 607 and 611, respectively.

The DRX period applied to the supplementary and anchor carrier may be the same. Alternatively, a different independent DRX period may be applied, or the DRX period for the supplementary carrier may be an integer multiple of the anchor carrier DRX period. The initiation of the DRX period is aligned with the DRX period of the anchor cell (perfectly aligned or aligned with an integer multiple of the DRX cycle as described above), but the duration may be different. Alternatively, the DRX period of the anchor carrier may be an integer multiple of the DRX period of the supplementary carrier.

The WTRU DTX pattern may be aligned with the overlapping period of both anchor and supplementary DRX cycle. This will allow the WTRU to fully turn off the radio on all carriers and both uplink and downlink, thus optimizing battery life. Alternatively, the DTX period may be aligned with the DRX period of the anchor cell or the supplementary cell.

Embodiments for DRX and/or DTX activation and de-activations are disclosed hereafter. When data is received on the supplementary carrier, the WTRU gets out of DRX to listen to subsequent HS-SCCH for a period of Inactivity_Threshold_for_UE_DRX_cycle. In the context of dual cell HSDPA, the HS-SCCH may be received on either one of the two downlink carriers. In the following description, a data transmission may include, but is not limited to, the HS-SCCH and HS-PDSCH, but fractional dedicated physical channel (F-DPCH) and HS-SCCH orders may not be considered as data transmissions.

In accordance with one embodiment, the DRX activation and de-activation are totally independent on each downlink carrier. If data is received on the supplementary carrier, the WTRU monitors the supplementary carrier for HS-SCCH (or HS-PDSCH) for the pre-configured period of time. The DRX pattern on the anchor carrier may be maintained as if no data has been received at the WTRU. The same scheme is applied if data is received on the anchor carrier.

Figure 7:
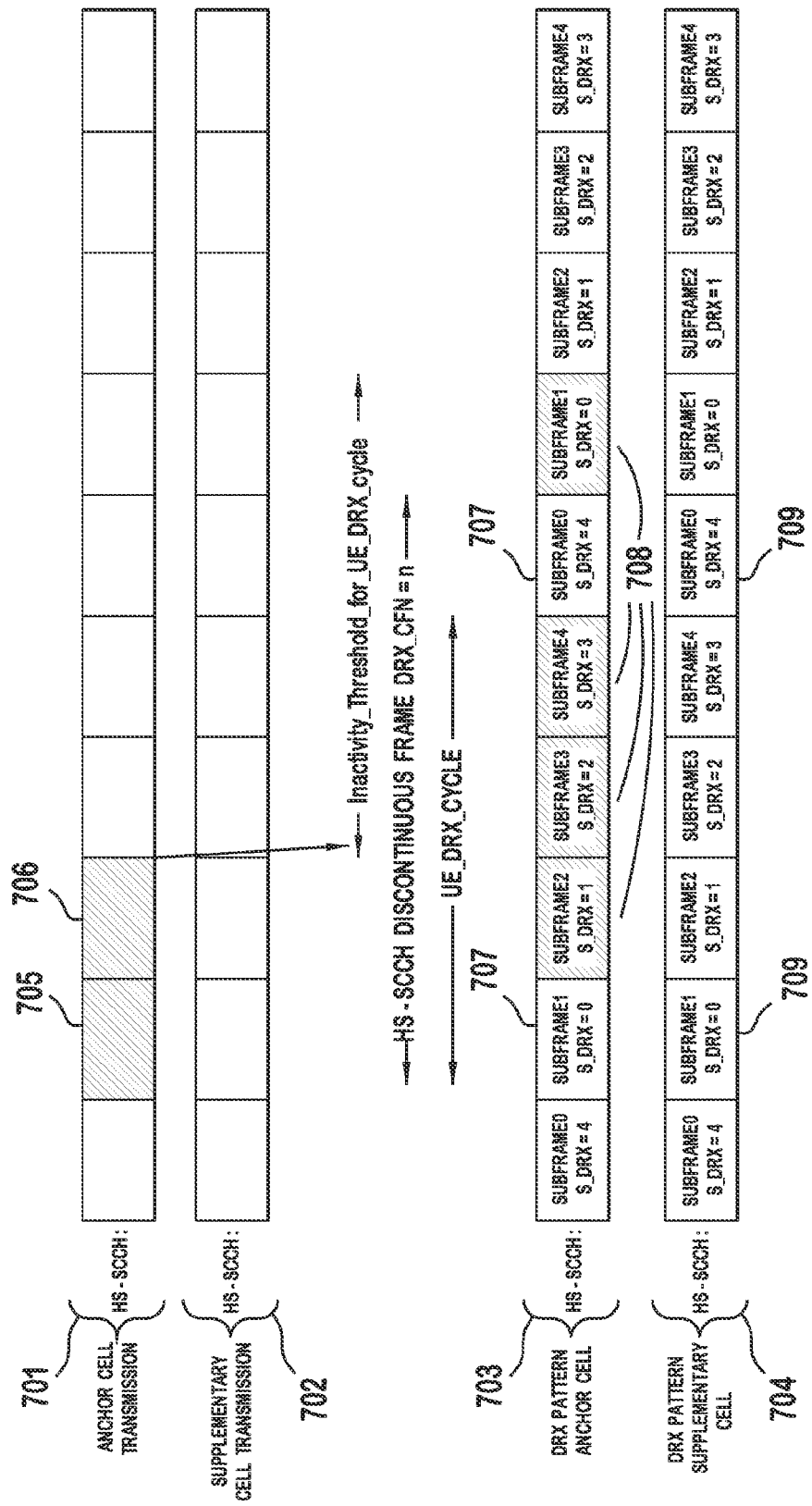
FIGS. 7 and 8 show example DRX de-activation on the anchor carrier after receiving data on the anchor carrier.

FIG. 7 shows an example DRX de-activation on the anchor carrier after receiving data on the anchor carrier. In the example of FIG. 7, the DRX patterns for the anchor carrier and the supplementary carrier are aligned with 2 ms TTI and UE_DRX_cycle=4. The top rows 701 and 702 are Node B transmissions on the anchor cell and the supplementary cell, respectively. The bottom rows 703 and 704 show DRX patterns of the WTRU on the anchor cell and the supplementary cell, respectively. The WTRU listens to an HS-SCCH on subframes 707 and 709 on both anchor and supplementary carriers in accordance with the configured DRX pattern. The Node B transmits an HS-SCCH via the anchor cell on subframes 705 and 706. Once the WTRU receives an HS-SCCH on the subframe 705, the WTRU deactivates the DRX on the anchor cell and starts monitoring on the anchor cell for Inactivity_Threshold_for_UE_DRX_cycle subframes, (i.e., subframes 708) from the last transmission 706 on the anchor cell. The WTRU monitors an HS-SCCH on the supplementary cell in accordance with the normal DRX pattern, (i.e., monitors subframes 709).

Figure 8:
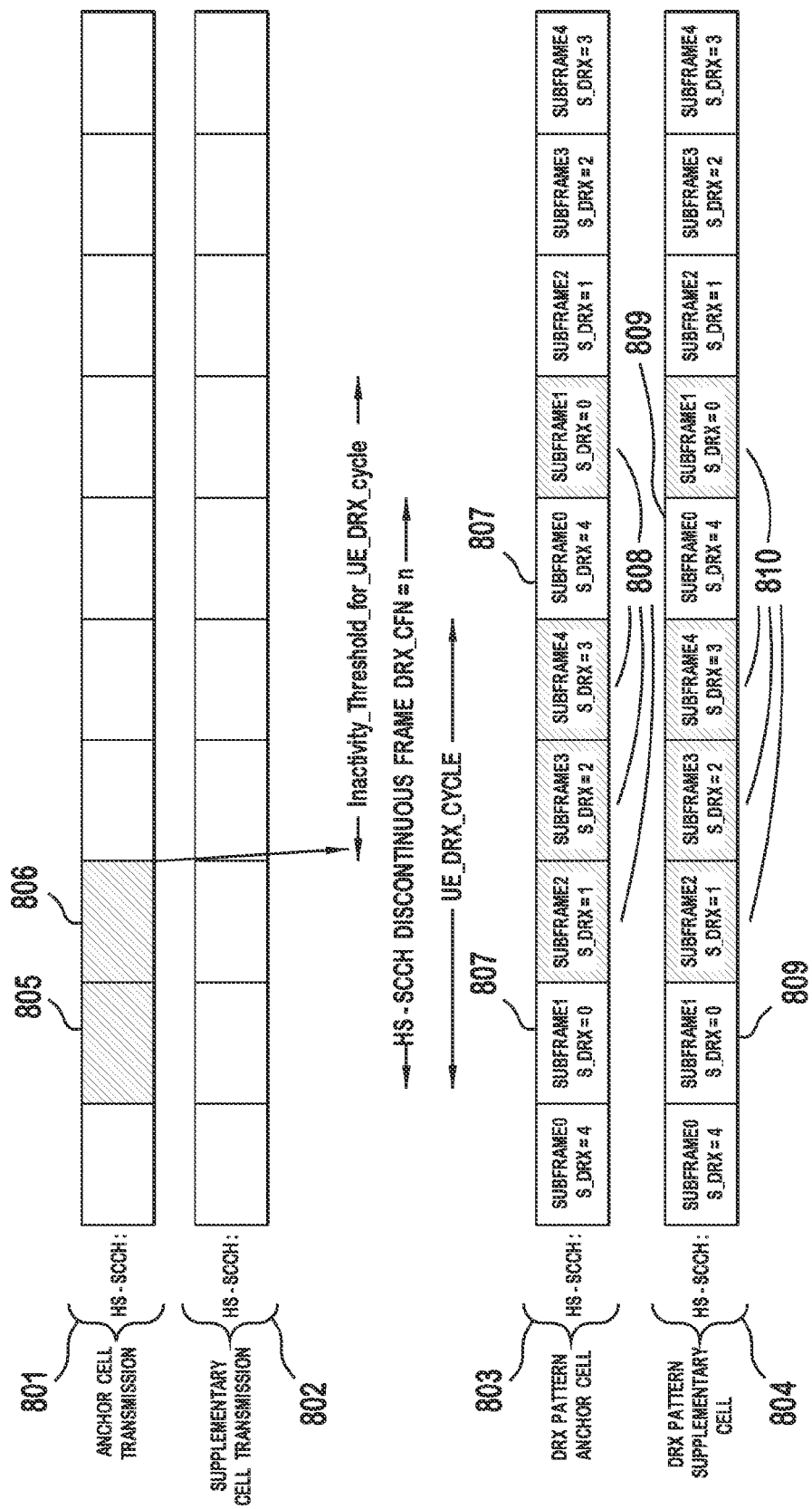

Alternatively, the DRX patterns of the anchor and supplementary carriers may be linked together. FIG. 8 shows an example DRX de-activation on the anchor carrier after receiving data on the anchor carrier in accordance with this alternative. In the example of FIG. 8, the DRX patterns for the anchor carrier and the supplementary carrier are aligned with 2 ms TTI and UE_DRX_cycle=4. The top rows 801 and 802 are Node B transmissions on the anchor cell and the supplementary cell, respectively. The bottom rows 803 and 804 show DRX patterns of the WTRU on the anchor cell and the supplementary cell, respectively. The WTRU listens to an HS-SCCH on subframes 807 and 809 on both anchor and supplementary carriers in accordance with the configured DRX pattern. The Node B transmits an HS-SCCH via the anchor cell on subframes 805 and 806. Once the WTRU receives an HS-SCCH on the subframe 805, the WTRU deactivates the DRX on both the anchor cell and the supplementary cell and starts monitoring on the anchor cell and the supplementary cell for Inactivity_Threshold_for_UE_DRX_cycle subframes, (i.e., subframes 808 and 810) from the last transmission 806 on the anchor cell.

Alternatively, when data is received on the supplementary carrier, the WTRU monitors both supplementary and anchor carriers for an HS-SCCH and/or an HS-PDSCH for the duration of Inactivity_Threshold_for_UE_DRX_cycle, but when the WTRU receives data on the anchor carrier, DRX may be maintained on the supplementary carrier.

These different mechanisms may be configured by the network using L3 signaling or predefined in the WTRU.

Embodiments for HS-PDSCH carrier indication are described hereinafter. In the case where the HS-SCCH is transmitted only one of the two carriers (preferably on the anchor carrier), an additional indication needs to be provided to indicate on which carrier to listen to for the associated HS-PDSCH. It should be noted that the embodiments described below are applicable to HS-SCCH scheduling for data transmissions over the HS-PDSCH or for HS-SCCH orders, wherein the WTRU does not need to monitor the HS-PDSCH after decoding its HS-DSCH radio network temporary identity (H-RNTI) on the HS-SCCH.

In accordance with one embodiment, the carrier for which the WTRU needs to monitor for the HS-PDSCH or the HS-SCCH is linked directly to the HS-SCCH channelization code. This may be achieved by adding an information element (IE) indicating the carrier (anchor or supplementary) in the HS-SCCH Info information element (IE) as defined in 3GPP TS 25.331 V.8.5.0 section 10.3.6.36a. For example, a new row may be added to the HS-SCCH Info IE as shown in Table 1. The newly added item for indicating the downlink carrier is underlined in Table 1.

TABLE 1

| Information Element/Group name | Need | Multi | Type and reference | Semantics description | Version |
| --- | --- | --- | --- | --- | --- |
| CHOICE mode | MP | | | | REL-5 |
| >FDD | | | | | REL-5 |
| >>DL Scrambling Code | MD | | Secondary scrambling code 10.3.6.74 | DL Scrambling code to be applied for HS-DSCH and HS-SCCH. Default is same scrambling code as for the primary CPICH. | REL-5 |
| >>HS-SCCH Channelisation Code Information | MP | 1 to <maxHSSCCHs> | | Note 2 | REL-5 |
| >>>HS-SCCH Channelization Code | MP | | Integer (0 ... 127) | | REL-5 |
| >>><u>Associated HS-PDSCH carrier</u> | MP | | Enumerated (Anchor, Supplementary) | | REL-x |

(remaining rows of table not shown)

Alternatively, each carrier is assigned a distinct H-RNTI (one for anchor charier and the other for supplementary carrier). The WTRU monitors the HS-SCCH for both H-RNTIs. If the H-RNTI of the anchor carrier is decoded on the HS-SCCH the WTRU knows that the scheduling is applicable to the anchor carrier and if the H-RNTI of the supplementary carrier is decoded on the HS-SCCH the WTRU knows that the scheduling is applicable to the supplementary carrier.

Alternatively, the carrier for the associated HS-PDSCH may be explicitly indicated in the associated HS-SCCH. The carrier information must be carried on the first part of the HS-SCCH as the WTRU needs this information to start buffering the HS-PDSCH. The carrier indication bit, $x_{ci}$, may be included as part of the conventional channelization code set bits in the HS-SCCH. This may be achieved by reducing the channelization code scheduling flexibility at the expense of carrier flexibility. A WTRU configured for DC-HSDPA operations would automatically re-interpret the channelization code set bits of the HS-SCCH according to a new definition to determine the carrier indication, the channelization code offset and the number of HS-PDSCH codes in the associated data transmission.

Alternatively, a new HS-SCCH type may be defined, where the first part contains an additional bit for carrier indication. For example, when the WTRU is not configured for MIMO operations, the new HS-SCCH type may include the following information in its part 1:

Channelization-code-set information (7 bits): $x_{ccs,1}$, $x_{ccs,2}, \ldots, x_{ccs,7}$
Modulation scheme information (1 bit): $x_{ms,1}$
Carrier indication information (1 bit): $x_{ci}$ Similarly, when the WTRU is configured for MIMO operations, the new HS-SCCH type may include the following information in its part 1:

Channelization-code-set information (7 bits): $x_{ccs,1}$, $x_{ccs,2}, \ldots, x_{ccs,7}$
Modulation scheme and number of transport blocks information (3 bits): $x_{ms,1}, x_{ms,2}, x_{ms,3}$
Precoding weight information (2 bits): $x_{pwipb,1}, x_{pwipb,2}$
Carrier indication information (1 bit): $x_{ci}$ For example, the carrier indication bit may be defined such that when $x_{ci}=0$, the associated HS-PDSCH is sent on the anchor carrier, otherwise the associated HS-PDSCH is sent on the supplementary carrier. It is possible for both cases to re-use similar channel coding mechanism as the conventional one for the HS-SCCH part 1 by simply defining new rate matching parameters.

In accordance with another embodiment, the WTRU determines whether it should decode data on the anchor carrier or on the supplementary carrier based on the timing of the HS-SCCH reception on either the anchor carrier or the supplementary carrier.

In case that staggered DRX patterns are used for the anchor and supplementary carriers, the indication is naturally based on the same criteria (formula) as the ones used to determine whether the WTRU should attempt reception on one of the carriers. This means that the HS-SCCH points to the anchor carrier if it is received at a time instant where reception on the anchor carrier is possible according to the DRX pattern, and on the supplementary carrier if it is received at a time instant where reception on the supplementary carrier is possible according to the DRX pattern. In either case the HS-SCCH may be transmitted on either the anchor carrier or the supplementary carrier, but no explicit indication of which carrier should be listened to has to be provided in the HS-SCCH itself.

Alternatively, there may be a distinct pattern for the reception of an HS-PDSCH on the anchor carrier or supplementary carrier. For example, the WTRU may decode the HS-PDSCH on the anchor carrier if the HS-SCCH is received on the set of subframes whose radio frame number CFN_Anchor and subframe number S_Anchor satisfy the following equation:

$$((5 \times CFN\_Anchor - Anchor\_Offset + S\_Anchor) \bmod 2) = 0. \quad \text{Equation(6)}$$

The WTRU decodes the HS-PDSCH on the supplementary carrier in all other subframes.

If this embodiment of signaling the downlink carrier to decode an HS-PDSCH from is used and staggered DRX patterns are used, the WTRU may need to receive the HS-SCCH in two consecutive TTIs starting from the sub-frames defined by the DRX reception pattern of either carrier.

Embodiments for fast supplementary carrier activation and de-activation are disclosed hereafter. The activation and de-activation of the supplementary carrier is performed by using L1 or L2 signaling.

In accordance with one embodiment, the network transmits an L1 signal to indicate to the WTRU that it should apply continuous reception (effectively de-activate DRX) to the supplementary carrier. This may be achieved by using a new HS-SCCH order or a new type of L1 message. The new HS-SCCH order or L1 message may be transmitted on either the anchor carrier or supplementary carrier. Upon reception of this signal from the network, the WTRU is allowed to start or stop monitoring the supplementary carrier based on the HS-SCCH order or L1 message, (e.g., supplementary carrier activation for '1' and supplementary carrier deactivation for '0').

Alternatively, the WTRU may autonomously disable monitoring the supplementary carrier, (i.e., HS-SCCH and/or HS-DPSCH on the supplementary carrier), upon expiration of an inactivity timer. More specifically, if no downlink data is received for a configured amount of time in the supplementary cell or optionally in both anchor and supplementary cells, the WTRU may disable monitoring on the supplementary cell.

The network may transmit an HS-SCCH order or L1 signal to the WTRU to indicate activation of the supplementary carrier. This may be achieved by using a new HS-SCCH order or a new type of L1 message on the anchor carrier. Alternatively, the WTRU may autonomously enable monitoring of the supplementary carrier if downlink traffic is received. Optionally, the criteria to enable monitoring of the supplementary carrier may be dependent on the type of traffic being received or the amount of data. Upon reception of this signal from the network, the WTRU may start monitoring the supplementary carrier using the same configuration as before de-activation order is received, or stop monitoring the supplementary carrier. In particular, the DRX status for the supplementary carrier may be restored to the state it was before the de-activation order was received.

Alternatively, upon activation or re-activation of the supplementary carrier, the DRX for the supplementary carrier may be always disabled (or alternatively always enabled). Alternatively, the DRX state of the supplementary carrier upon activation or re-activation may be configured by higher layer signaling.

Alternately, upon activation or re-activation of the supplementary carrier, the WTRU may start using the same DRX pattern as the anchor cell, (aligned or staggered). For instance, if the anchor cell has DRX active at the time of activation of the supplementary cell, the WTRU may also initiate DRX using the same reception patterns. If the anchor cell is in CRX the supplementary carrier may also be in CRX.

The supplementary carrier activation and de-activation may also be considered as a dual (or multi) DRX scheme. The first DRX cycle comprises DRX patterns being applied to both carriers using one of the embodiments applied above, while the second DRX cycle comprises disabling the supplementary carrier and continued a DRX pattern or continuous reception on the anchor carrier. This is a 2-stage DRX mechanism. The first stage comprises going for CRX to DRX and the second stage comprises going from DRX to inactive. The transition between the DRX cycles may depend on one or a combination of the following options:

(1) Inactivity timers;
(2) HS-SCCH order or L1 signaling as described above;
(3) RRC signaling;
(4) Reception of downlink traffic, (i.e., HS-SCCH or HS-DPSCH), in one of the carriers; and
(5) Reception of downlink traffic, (i.e., HS-SCCH or HS-DPSCH), in one of the carriers indicating scheduling information on the other carrier.

Once the WTRU is in the second DRX cycle, the WTRU may transition to the first DRX cycle (where both carriers are in DRX) if an HS-SCCH order is received or if downlink traffic is received. Alternatively, the WTRU may transition directly to continuous transmission from the second DRX cycle.

Alternately, the WTRU may disable and enable monitoring of the downlink anchor cell channels, (i.e., HS-SCCH and/or HS-DPSCH), and listens to the supplementary cell using a configured DRX cycle or continuous reception in supplementary cell. The options described above, to enable/disable monitoring of the supplementary cell are also applicable to this alternative.

Embodiments for improving the power-saving at the WTRU are disclosed hereafter. A new set of rules and signaling is defined for fast activation and de-activation of DRX/DTX for a WTRU in a DC-HSDPA mode. Activation and de-activation may be performed separately for each downlink carrier. This may be achieved by signaling explicitly the activation/deactivation order to the WTRU over separate HS-SCCH orders for each carrier. This flexibility results in additional power consumption, signaling load, and increased code space usage on the downlink.

In accordance with one embodiment, a dual DTX/DRX state for a DC-HSDPA-capable WTRU is defined by the combination of the status of the supplementary carrier (active or not), the DRX state (active or not active) of the anchor and supplementary carriers, and the DTX status (active or not active) on the uplink carrier. A DC-HSDPA-capable WTRU may be in a number of dual DTX/DRX states. Some transitions from one dual DTX/DRX state to another may be more prevalent than others. As such, the signaling cost associated to these should be minimized.

The following set of signaling mechanisms and rules are provided to reduce the signaling load associated to the prevalent state transitions. They may be used in any order or in any combinations.

Rule 1: When the supplementary carrier is in the active state and when DRX is explicitly activated at the anchor carrier (via a regular Release-7 HS-SCCH order), DRX is implicitly activated on the supplementary carrier. This rule allows reducing the number of HS-SCCH orders to put the WTRU in DRX for both carriers in periods of low downlink activity.

Rule 2: Upon explicit activation of the supplementary carrier, (e.g., via an HS-SCCH order), the DRX on both the anchor and supplementary carriers is implicitly deactivated. Optionally, the DTX on the UL anchor carrier (and optionally on the UL supplementary carrier, if it exists) is also implicitly deactivated. While this could be achieved via multiple HS-SCCH orders, this new rule allows the network to quickly turn the WTRU in a very active state in a period of high downlink activity.

Rule 3: When the supplementary carrier is deactivated explicitly (e.g., using an HS-SCCH order), DRX is implicitly enabled at the anchor carrier. Optionally, DTX may also be implicitly enabled at the UL anchor carrier. This rule allows the network to move a WTRU into battery saving mode faster in period of low activity.

Rule 4: When DRX is explicitly disabled (e.g., via an HS-SCCH order) on the supplementary carrier, the DRX on the anchor carrier is implicitly disabled. Optionally, if a secondary UL carrier exists, when DTX is explicitly disabled on the secondary UL carrier, DTX is implicitly disabled on the UL anchor carrier. This rule allows the network to move a WTRU into battery saving mode faster in period of low activity.

Figure 9:
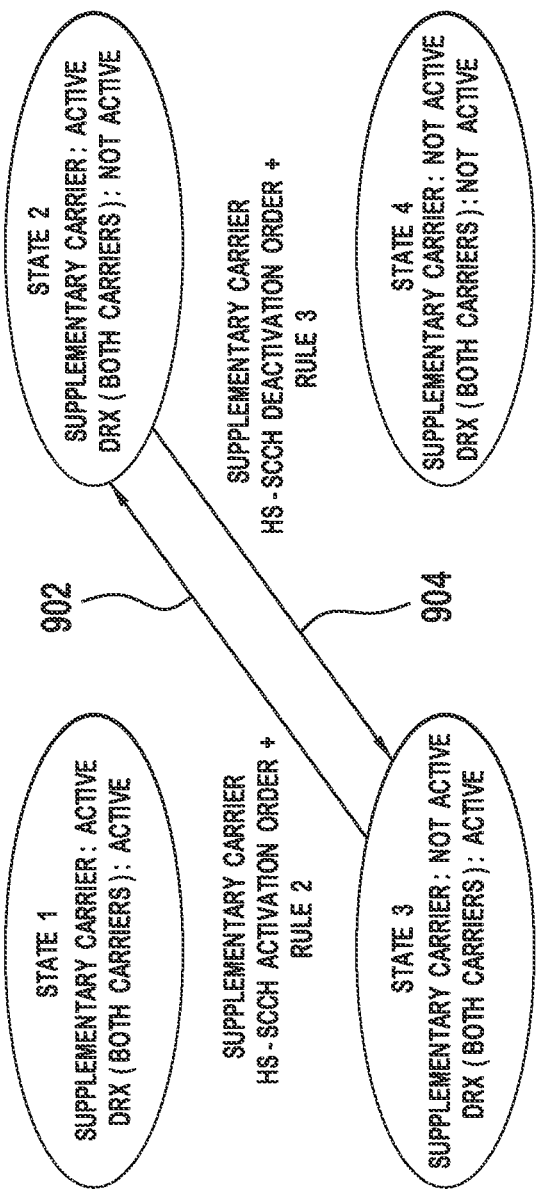
FIG. 9 is a state diagram showing the transition of a WTRU state of DRX activation/de-activation and dual cell activation/de-activation.

FIG. 9 shows how using single supplementary carrier activation and deactivation orders may be used in conjunction with Rule 2 and Rule 3 to achieve transitions from low to high power states, and vice versa. In FIG. 9, four states are defined: state 1 (supplementary cell active, DRX both cells active), state 2 (supplementary cell active, DRX both cells not active), state 3 (supplementary cell not active, DRX both cells active), and state 4 (supplementary cell not active, DRX both cells not active). Upon receipt of supplementary cell activation order (step 902), the WTRU transitions from state 3 to state 2 and activates the supplementary cell and deactivates DRX for both cells. Upon receipt of supplementary cell deactivation order (step 904), the WTRU transitions from state 3 to state 2 and deactivates the supplementary cell and activates the DRX for both cells.

Alternatively, some of the above implicit rules may be implemented using explicit signaling. For instance, Rule 2 and Rule 3 may also be achieved by using explicit signaling. One possible way to do this using a single HS-SCCH order by using reserved bits in the conventional HS-SCCH order bits for activation and deactivation of the supplementary cell and indicating activation and deactivation of DRX (for both anchor and supplementary carriers) and optionally DTX (on the UL carrier), respectively.

For example, the first bit of the three HS-SCCH order bits may be used to indicate DRX activation and deactivation of the anchor and supplementary cells and the second bit of the three HS-SCCH order bits may be used to indicate DTX activation and deactivation. For example, if the first bit is set to '0', the HS-SCCH order is a DRX de-activation order for both the anchor and supplementary cells. If the first bit is set to '1', the HS-SCCH order is a DRX activation order for both the anchor and supplementary cells. If the second bit is set to '0', the HS-SCCH order is a DTX de-activation order. If the second bit is set to '1', the HS-SCCH order is a DTX activation order. If a supplementary UL carrier exists, the DTX may also be applied to both anchor and supplementary uplink carriers.

In DC-HSDPA, two channel quality indicator (CQI) feedback cycle values must be given to the WTRU: one for the anchor cell and another for the supplementary cell. These values may be explicitly provided to the WTRU by the network via RRC signaling: one for the anchor carrier (denoted by variable k) and one for the supplementary carrier (denoted by variable $k_s$). This allows the CQI reporting rate to be adjusted by the network, for example to optimize with respect to different DRX cycles.

In accordance with one embodiment, the CQI feedback cycle duration for the supplementary carrier may implicitly be determined by the WTRU. The CQI feedback cycle for the supplementary carrier may be identical to the CQI feedback cycle of the anchor carrier, (i.e., $k_s$=k). Alternatively, for the case where the DRX cycle for the supplementary carrier is a factor (M) of the DRX cycle of the anchor carrier, the CQI feedback cycle for the supplementary carrier may be given by the same factor times the CQI feedback cycle for the anchor carrier, (i.e., $k_s=M \times k$). The value M may be signaled or pre-configured in the specifications, (e.g., M=2). This approach may be combined to other embodiments disclosed above, (e.g., time-offset CQI reporting), to achieve maximum flexibility.

WTRU actions when activating/de-activating the supplementary cell via an HS-SCCH order are described. Upon de-activation of the supplementary cell via an HS-SCCH order, the WTRU may flush the HARQ buffers associated to the supplementary cell, and/or instruct the medium access control (MAC) entity that the next received HARQ transmission (upon re-activation of the supplementary cell) for each configured HARQ processes associated to the supplementary cell should be considered as a first transmission.

There are several methods to carry out the above actions. In one approach, upon reception of the supplementary cell de-activation order, the physical layer may indicate to the RRC layer that the supplementary cell is being de-activated. In turn, the RRC layer may instruct the MAC layer that the next HARQ transmission for all configured HARQ processes associated to the supplementary cell should be considered as a first HARQ transmission. The RRC layer may also instruct the MAC layer to flush the HARQ buffers associated to the supplementary cell.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for supporting dual cell high speed downlink packet access (DC-HSDPA), the method comprising:
   receiving, via an anchor carrier, a physical layer message for activating a supplementary carrier;
   activating the supplementary carrier when the physical layer message for activating the supplementary carrier is received via the anchor carrier;
   receiving, via the anchor carrier or the supplementary carrier, a physical layer message indicating activation of discontinuous reception (DRX);
   applying a same DRX pattern to both the anchor carrier and the supplementary carrier in response to the physical layer message indicating activation of DRX such that DRX cycles of the anchor carrier and the supplementary carrier are aligned in the DRX pattern, wherein the activation of DRX is common to both the anchor carrier and the supplementary carrier.

2. The method of claim 1, further comprising:
   receiving, via the anchor carrier or the supplementary carrier, a physical layer message indicating de-activation of DRX for at least one of the anchor carrier or the supplementary carrier; and
   de-activating DRX on both the anchor carrier and the supplementary carrier in response to the physical layer message indicating de-activation of DRX.

3. The method of claim 2, wherein the physical layer message indicating activation of DRX is a high speed shared control channel (HS-SCCH) order, and wherein the physical layer message indicating de-activation of DRX is an HS-SCCH order.

4. The method of claim 2, further comprising:
   receiving, via one of the anchor carrier or the supplementary carrier, a physical layer message for de-activating the supplementary carrier; and
   de-activating the supplementary carrier when the physical layer message for de-activating the supplementary carrier is received via the anchor carrier or the supplementary carrier.

5. The method of claim 4, wherein the physical layer message for activating the supplementary carrier is a high speed shared control channel (HS-SCCH) order, and wherein the physical layer message for de-activating the secondary carrier is an HS-SCCH order.

6. The method of claim 4, further comprising:
   flushing a hybrid automatic repeat request (HARQ) buffer associated with the supplementary carrier upon de-activation of the supplementary carrier.

7. The method of claim 4, further comprising:
   receiving a physical layer signal for re-activating the supplementary carrier via the anchor carrier;
   re-activating the supplementary carrier when the physical layer message for re-activating the supplementary carrier is received via the anchor carrier; and
   processing data received via the supplementary carrier as original data received after re-activating the supplementary carrier.

8. The method of claim 1, further comprising:
   receiving data on the anchor carrier or the supplementary carrier during the DRX pattern; and
   upon receiving the data on the anchor carrier or the supplementary carrier, de-activating DRX and monitoring at least one of the anchor carrier or the supplementary carrier for a duration of an Inactivity_Threshold_for_UE_DRX_cycle.

9. The method of claim 8, further comprising:
continuing the DRX pattern for the anchor carrier and the supplementary carrier after the duration of the Inactivity_Threshold_for_UE_DRX_cycle.

10. A wireless transmit/receive unit (WTRU) that supports dual cell high speed downlink packet access (DC-HSDPA), the WTRU comprising:
a receiver configured to:
receive, via an anchor carrier, a physical layer message for activating a supplementary carrier, and
receive, via the anchor carrier or the supplementary carrier, a physical layer message indicating activation of discontinuous reception (DRX); and
a controller configured to:
activate the supplementary carrier when the physical layer message for activating the supplementary carrier is received via the anchor carrier, and
apply a same DRX pattern to both the anchor carrier and the supplementary carrier in response to the physical layer message indicating activation of DRX such that DRX cycles of the anchor carrier and the supplementary carrier are aligned in the DRX pattern, and wherein the activation of DRX is common to both the anchor carrier and the supplementary carrier.

11. The WTRU of claim 10, wherein the receiver is further configured to receive, via the anchor carrier or the supplementary carrier, a physical layer message indicating de-activation of DRX for at least one of the anchor carrier or the supplementary carrier, and wherein the controller is further configured to de-activate DRX on both the anchor carrier and the supplementary carrier in response to the physical layer message indicating de-activation of DRX.

12. The WTRU of claim 11, wherein the physical layer message indicating activation of DRX is a high speed shared control channel (HS-SCCH) order, and wherein the physical layer message indicating de-activation of DRX is an HS-SCCH order.

13. The WTRU of claim 11, wherein the receiver is further configured to receive, via one of the anchor carrier or the supplementary carrier, a physical layer message for de-activating the supplementary carrier, and wherein the controller is further configured to de-activate the supplementary carrier when the physical layer message for de-activating the supplementary carrier is received via the anchor carrier or the supplementary carrier.

14. The WTRU of claim 13, wherein the physical layer message for activating the supplementary carrier is a high speed shared control channel (HS-SCCH) order, and wherein the physical layer message for de-activating the supplementary carrier is an HS-SCCH order.

15. The WTRU of claim 13, wherein the controller is further configured to flush a hybrid automatic repeat request (HARQ) buffer associated with the supplementary carrier upon de-activation of the supplementary carrier.

16. The WTRU of claim 13, wherein the receiver is further configured to receive a physical layer signal for re-activating the supplementary carrier via the anchor carrier, and wherein the controller is further configured to:
re-activate the supplementary carrier when the physical layer message for re-activating the supplementary carrier is received via the anchor carrier, and
process data received via the supplementary carrier as original data received after re-activating the supplementary carrier.

17. The WTRU of claim 10, wherein the receiver is further configured to receive data on the anchor carrier or the supplementary carrier during the DRX pattern, and wherein the controller is further configured to, upon receiving the data on the anchor carrier or the supplementary carrier, de-activate DRX and monitor at least one of the anchor carrier or the supplementary carrier for a duration of an Inactivity_Threshold_for_UE_DRX_cycle.

18. The WTRU of claim 17, wherein the controller is further configured to continue the DRX pattern for the anchor carrier and the supplementary carrier after the duration of the Inactivity_Threshold_for_UE_DRX_cycle.

* * * * *